US009834038B2

(12) United States Patent
Chung

(10) Patent No.: US 9,834,038 B2
(45) Date of Patent: Dec. 5, 2017

(54) AXLE ASSEMBLY HAVING A BEARING PRELOAD BOLT

(71) Applicant: ArvinMeritor Technology, LLC, Troy, MI (US)

(72) Inventor: I-Chao Chung, Troy, MI (US)

(73) Assignee: ArvinMeritor Technology, LLC, Troy, MI (US)

(*) Notice: Subject to any disclaimer, the term of this patent is extended or adjusted under 35 U.S.C. 154(b) by 56 days.

(21) Appl. No.: 14/930,843

(22) Filed: Nov. 3, 2015

(65) Prior Publication Data

US 2017/0120675 A1   May 4, 2017

(51) Int. Cl.
| | |
|---|---|
| *B60B 35/18* | (2006.01) |
| *B60B 35/12* | (2006.01) |
| *B60B 35/16* | (2006.01) |
| *B60B 27/00* | (2006.01) |
| *B60K 17/04* | (2006.01) |
| *F16B 39/02* | (2006.01) |
| *F16C 25/06* | (2006.01) |
| *F16H 57/08* | (2006.01) |
| *F16C 19/36* | (2006.01) |
| *F16C 19/54* | (2006.01) |

(52) U.S. Cl.
CPC .......... *B60B 35/125* (2013.01); *B60B 27/001* (2013.01); *B60B 27/0021* (2013.01); *B60B 27/0052* (2013.01); *B60B 35/16* (2013.01); *B60B 35/18* (2013.01); *B60K 17/046* (2013.01); *F16B 39/02* (2013.01); *F16C 25/06* (2013.01); *F16C 19/364* (2013.01); *F16C 19/548* (2013.01); *F16C 2226/60* (2013.01); *F16H 57/082* (2013.01); *F16H 2057/085* (2013.01)

(58) Field of Classification Search
CPC ............. F16H 57/082; F16H 2057/085; B60B 35/125; B60B 35/18; B60B 27/0021; B60B 35/16; B60B 27/001
USPC ........................................... 475/331; 180/372
See application file for complete search history.

(56) References Cited

U.S. PATENT DOCUMENTS

| | | | | |
|---|---|---|---|---|
| 3,156,506 A | * | 11/1964 | Scheifele | .................. B60B 3/18 384/589 |
| 3,495,314 A | * | 2/1970 | Morris | .................. F16J 15/106 210/232 |
| 4,441,570 A | * | 4/1984 | Damm | ...................... F16H 1/28 180/255 |

(Continued)

FOREIGN PATENT DOCUMENTS

| | | |
|---|---|---|
| CH | 393838 A | 6/1965 |
| DE | 847549 C | 8/1952 |

(Continued)

OTHER PUBLICATIONS

United States Patent and Trademark Office, U.S. Appl. No. 14/930,918, filed Nov. 3, 2015.

(Continued)

*Primary Examiner* — Roger L Pang
(74) *Attorney, Agent, or Firm* — Brooks Kushman P.C.

(57) ABSTRACT

An axle assembly having a preload bolt. The preload bolt may couple an output flange that may be supported by a roller bearing assembly to a planet carrier. A preload force may be exerted on the roller bearing assembly when the preload bolt is tightened to the planet carrier.

19 Claims, 10 Drawing Sheets

(56) References Cited

U.S. PATENT DOCUMENTS

| | | | | |
|---|---|---|---|---|
| 5,460,578 | A * | 10/1995 | Giuriati | B60K 17/046 188/72.9 |
| 5,645,148 | A * | 7/1997 | Saurin | B60T 1/062 188/106 F |
| 5,871,413 | A | 2/1999 | Tar et al. | |
| 6,817,963 | B1 * | 11/2004 | Solka | B60K 17/046 180/372 |
| 7,044,883 | B2 * | 5/2006 | Andersson | B60K 17/046 180/344 |
| 8,251,861 | B2 * | 8/2012 | Varela | B60K 17/046 180/372 |
| 8,771,132 | B2 * | 7/2014 | Fujimoto | B60K 17/046 475/311 |
| 8,951,156 | B2 | 2/2015 | Klemm et al. | |
| 2003/0094849 | A1 * | 5/2003 | Joki | B60B 27/001 301/105.1 |
| 2004/0254044 | A1 * | 12/2004 | Oberstarr | B60K 17/046 475/323 |
| 2005/0020400 | A1 * | 1/2005 | Chung | B60K 17/046 475/331 |
| 2010/0151982 | A1 * | 6/2010 | Waksmundzki | F16H 48/08 475/226 |

FOREIGN PATENT DOCUMENTS

| | | |
|---|---|---|
| DE | 10230768 A1 | 1/2004 |
| DE | 102007017700 A1 | 10/2008 |
| DE | 102007045531 A1 | 4/2009 |
| DE | 102010049615 A1 | 5/2011 |
| EP | 1 396 660 A2 | 3/2004 |
| EP | 2735463 A1 | 5/2014 |
| JP | 2003127683 A | 5/2003 |
| WO | 2007049882 A1 | 5/2007 |

OTHER PUBLICATIONS

United States Patent and Trademark Office, U.S. Appl. No. 14/930,947, filed Nov. 3, 2015.

Australia Government, IP Australia, Examination Report No. 1 for standard patent application for the corresponding Australian Patent Application No. 2016216642, dated May 26, 2017.

European Patent Office, Extended European search report for the corresponding European Patent Application No. 16185332.0 dated Apr. 7, 2017.

Norhtermann, H.K. et al., "L'Archivio del Progettista," Organi di Trasmissione, Milano, IT, pp. 52-53, Nov. 1992.

\* cited by examiner

AXLE ASSEMBLY HAVING A BEARING PRELOAD BOLT

TECHNICAL FIELD

This disclosure relates to an axle assembly having a bearing preload bolt.

BACKGROUND

A transfer case having a planetary gear set is disclosed in U.S. Pat. No. 8,951,156.

SUMMARY

In at least one embodiment, an axle assembly is provided. The axle assembly may include an axle housing, a wheel bearing cage, a planetary gear set, an output flange, a roller bearing assembly, and a preload bolt. The wheel bearing cage may be fixedly positioned with respect to the axle housing. The planetary gear set may be received in the wheel bearing cage. The planetary gear set may have a planet carrier that may rotate about an axis. The output flange may be configured to facilitate mounting of a wheel. The output flange may be disposed on the planet carrier. The roller bearing assembly may be disposed on the wheel bearing cage and may rotatably support the output flange. The preload bolt may couple the output flange to the planet carrier. A preload force may be exerted on the roller bearing assembly when the preload bolt is tightened to the planet carrier.

In at least one embodiment, an axle assembly is provided. The axle assembly may include an axle housing, a brake housing, a wheel bearing cage, an axle shaft, a planetary gear set, an output flange, and a preload bolt. The brake housing may be fixedly disposed on the axle housing. The wheel bearing cage may be fixedly disposed on the brake housing. The axle shaft may be disposed in the axle housing and may rotate about an axis. The planetary gear set may be disposed on the axle shaft and may be received in the wheel bearing cage. The planetary gear set may have a planet carrier. The output flange may be disposed on the planet carrier. The preload bolt may extend along the axis and may couple the output flange to the planet carrier.

In at least one embodiment, an axle assembly is provided. The axle assembly may include an axle housing, a wheel bearing cage, a planetary gear set, an output flange, a first roller bearing assembly, a second roller bearing assembly, and a preload bolt. The wheel bearing cage may be fixedly positioned with respect to the axle housing. The planetary gear set may be received in the wheel bearing cage and may have a planet carrier that may rotate about an axis. The output flange may be partially received in the wheel bearing cage and may be disposed on the planet carrier. The first and second roller bearing assemblies may be disposed on the wheel bearing cage and may rotatably support the output flange. The preload bolt may couple the output flange to the planet carrier. The preload bolt may exert a preload force that may bias the first roller bearing assembly toward the second roller bearing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
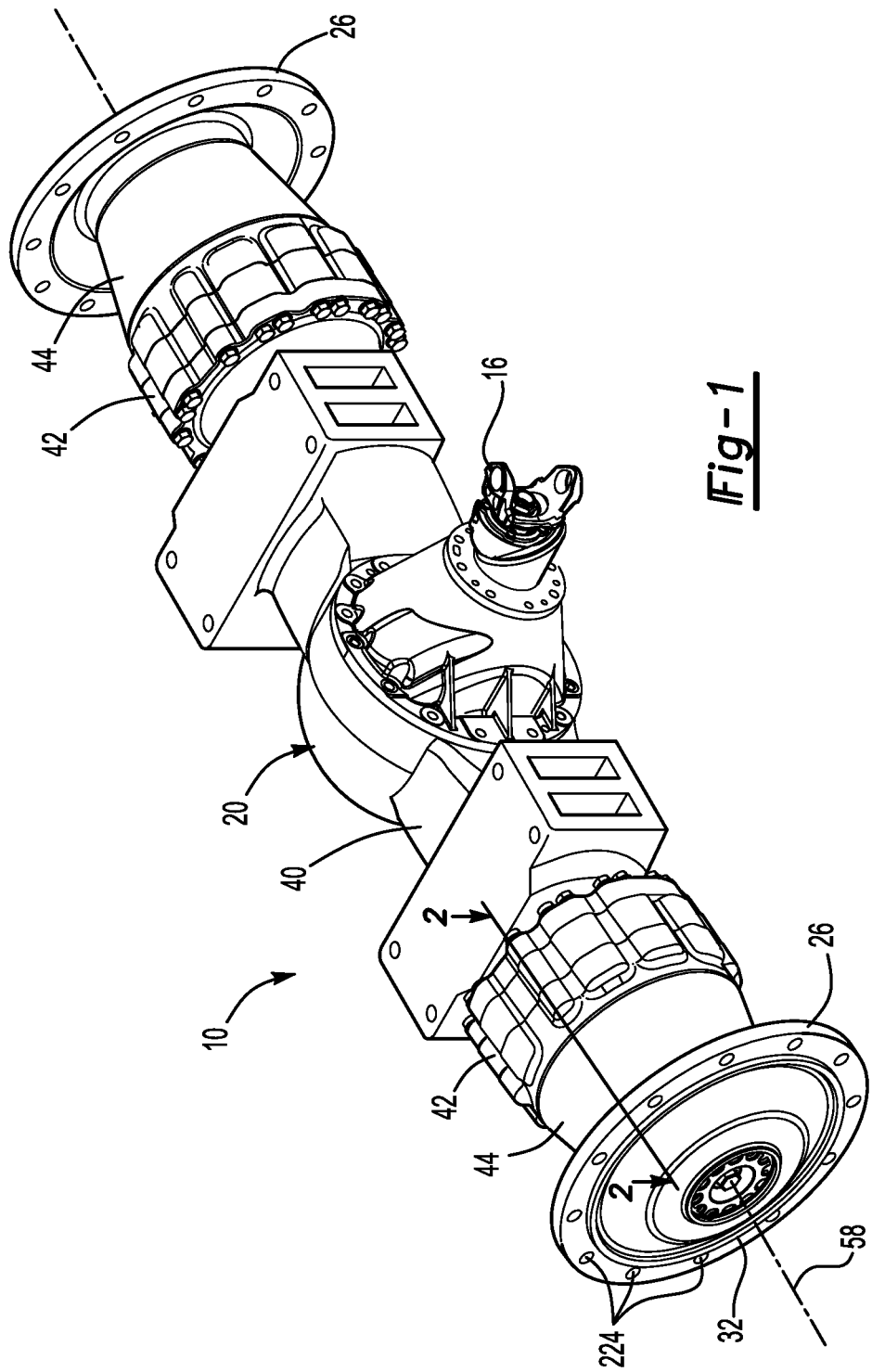
FIG. 1 is a perspective view of an exemplary axle assembly.

Referring to FIG. 1, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

Figure 2:
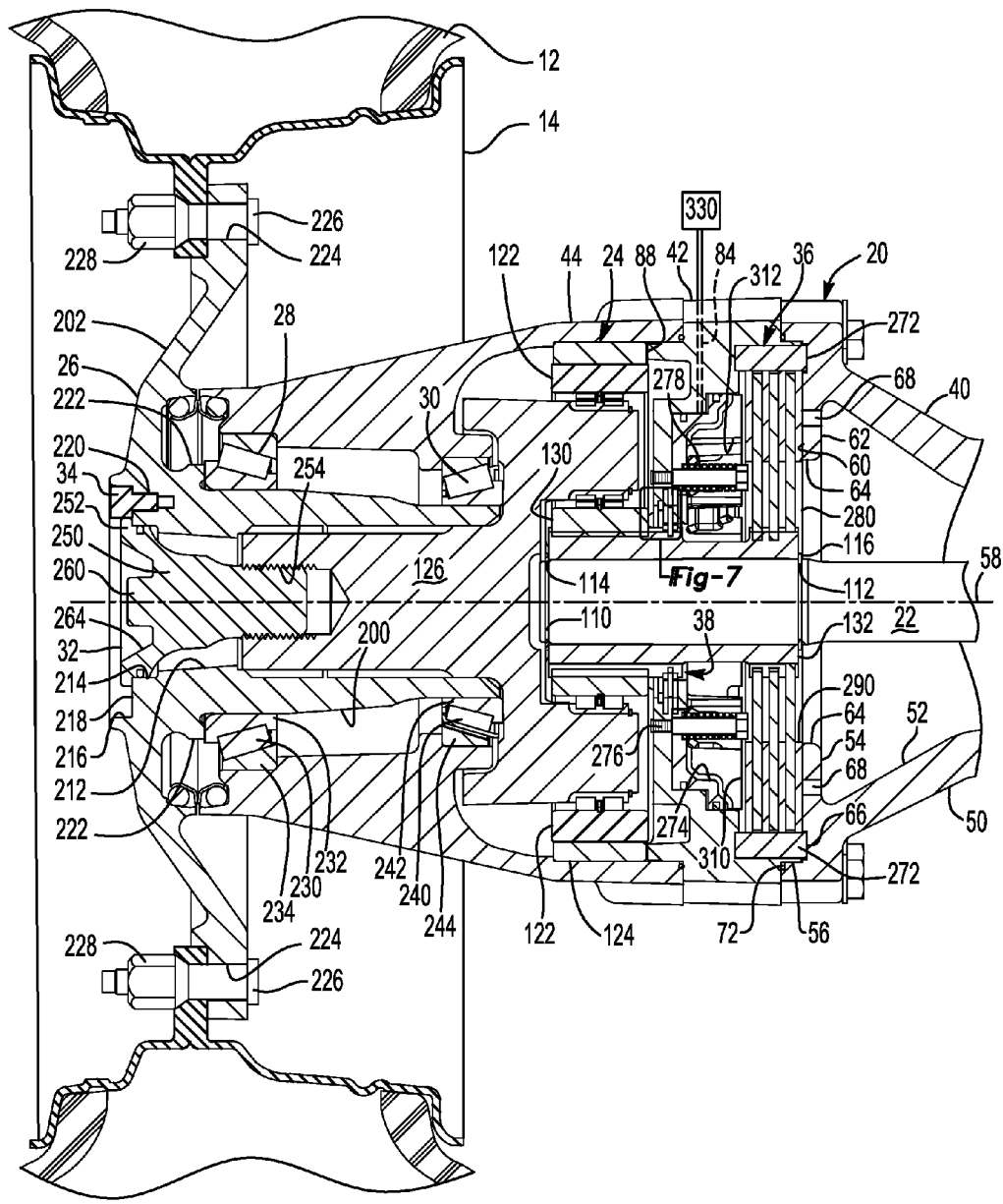
FIG. 2 is a section view of the axle assembly along section line 2-2.

The axle assembly 10 may be part of a vehicle drivetrain that may provide torque to one or more traction wheel assemblies, such as a wheel assembly that may include a tire 12 mounted on a wheel 14 as is best shown in FIG. 2. The vehicle drivetrain may include a power source, such as a motor, that may be operatively connected to an input 16 of the axle assembly 10. The input 16 may be operatively connected to a differential of the axle assembly 10, which in turn may be operatively connected to a wheel assembly via an axle shaft.

One or more axle assemblies 10 may be provided with the vehicle. For example, the axle assembly 10 may be part of a tandem axle configuration or multi-axle configuration that may include a plurality of axle assemblies that may be connected in series. Alternately, an axle assembly 10 may not be connected in series with another axle assembly in one or more embodiments. Referring to FIGS. 1 and 2, the axle assembly 10 may include a housing assembly 20, an axle shaft 22, a planetary gear set 24, an output flange 26, a first roller bearing assembly 28, a second roller bearing assembly 30, a preload bolt 32, a locking fastener 34, a brake assembly 36, and a sun gear positioning arrangement 38.

The housing assembly 20 may receive various components of the axle assembly 10. For example, components and subassemblies like the axle shaft 22, planetary gear set 24, output flange 26, first roller bearing assembly 28, second roller bearing assembly 30, brake assembly 36, and sun gear positioning arrangement 38 may be disposed inside the housing assembly 20. In addition, the housing assembly 20 may facilitate mounting of the axle assembly 10 to the vehicle. In at least one embodiment, the housing assembly 20 may include an axle housing 40, a brake housing 42, and a wheel bearing cage 44.

Figure 5:
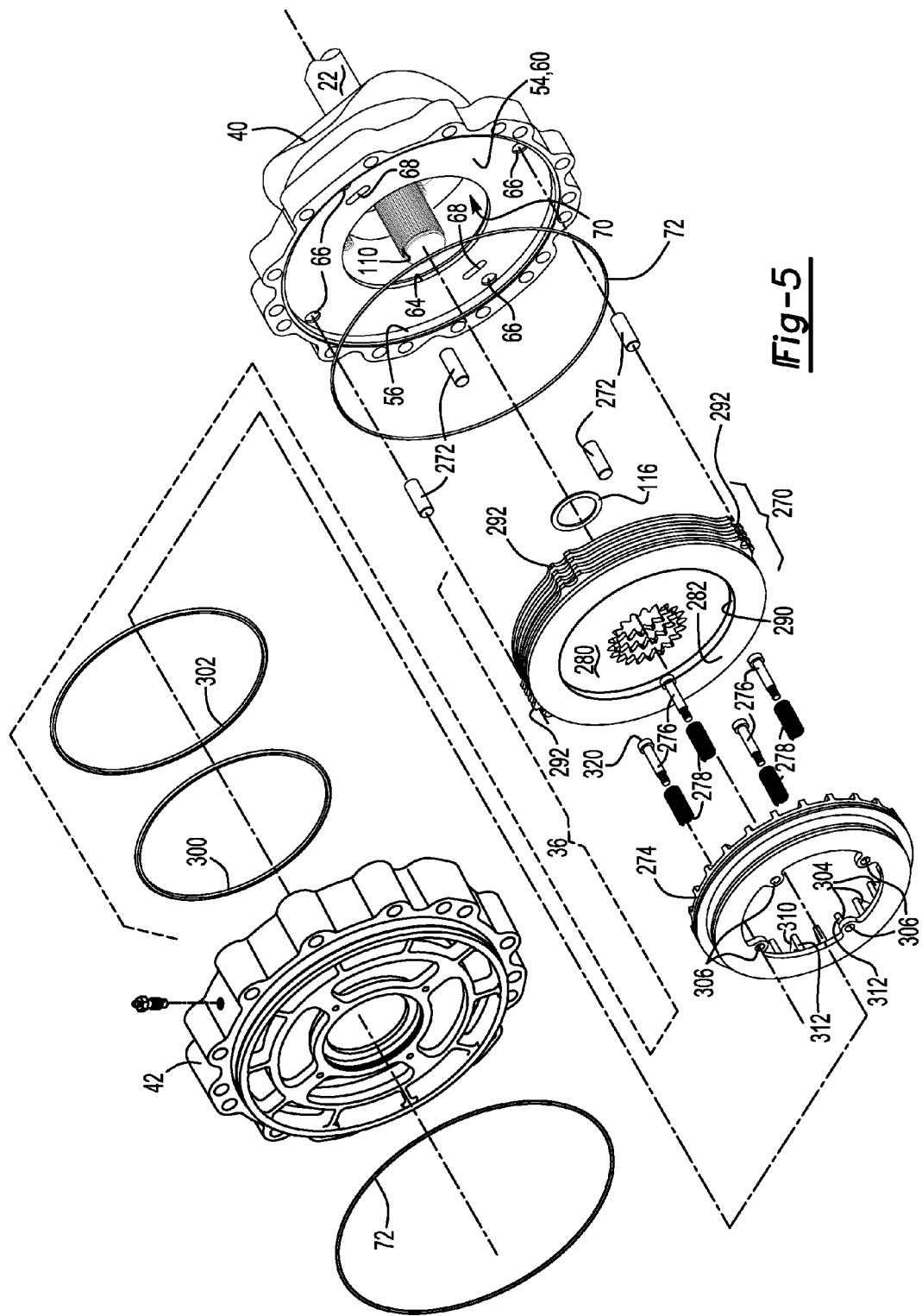

The axle housing 40 may be disposed proximate the center of the housing assembly 20. For example, the axle housing 40 may extend between brake housings 42 that may be disposed near opposite ends of the axle assembly 10. The axle housing 40 may be configured to receive a differential and the axle shafts 22 that may extend from the differential. Referring to FIGS. 2 and 5, the axle housing 40 may have an exterior surface 50, an interior surface 52, a flange 54, and a rim surface 56.

The exterior surface 50 may be a visible external surface of the axle housing 40.

The interior surface 52 may be disposed opposite the exterior surface 50. The interior surface 52 may face toward and may extend around the axle shaft 22 and an axis 58 about which the axle shaft 22 may rotate.

The flange 54 may be integrally formed with the axle housing 40. As such, the flange 54 may be part of the axle housing 40 and may not be a separate component. The flange 54 may be disposed inside the axle housing 40 and may extend from the interior surface 52 toward the axis 58. In at least one embodiment, the flange 54 may be at least partially defined by a first flange surface 60, a second flange surface 62, and a third flange surface 64 and may include one or more dowel holes 66 and one or more lubricant holes 68.

The first flange surface 60 may extend from the interior surface 52 toward the axis 58. The first flange surface 60 may face toward and may be disposed adjacent to the brake assembly 36. In addition, the first flange surface 60 may extend from the rim surface 56 to the third flange surface 64. The first flange surface 60 may be substantially planar and may be disposed substantially perpendicular to the axis 58 in one or more embodiments.

The second flange surface 62 may be disposed opposite the first flange surface 60. As such, the second flange surface 62 may face away from the brake assembly 36. The second flange surface 62 may extend from the interior surface 52 toward the axis 58. In addition, the second flange surface 62 or a portion thereof may be disposed substantially perpendicular to the axis 58 and substantially parallel to the first flange surface 60.

The third flange surface 64 may extend from the first flange surface 60 to the second flange surface 62. The third flange surface 64 may extend around the axis 58 and may define a flange hole 70 through which the axle shaft 22 may extend. In at least one embodiment, the third flange surface 64 may be radially disposed with respect to the axis 58. The third flange surface 64 may be completely spaced apart from the axle shaft 22 so as not to interfere with rotation of the axle shaft 22.

One or more dowel holes 66 may extend into the flange 54. In FIG. 5, four dowel holes 66 are shown; however, it is contemplated that a greater or lesser number of dowel holes 66 may be provided. The dowel holes 66 may be spaced apart from each other and arranged around the axis 58. In addition, the dowel holes 66 may be disposed further from the axis 58 than the interior surface 52, third flange surface 64, and a lubricant hole 68. As is best shown in FIG. 2, a dowel hole 66 may be configured as a blind hole that may extend from the first flange surface 60 in a direction that may extend away from the brake assembly 36. The dowel holes 66 may be configured to receive a dowel that may help position a disc pack of the brake assembly 36 as will be discussed in more detail below.

One or more lubricant holes 68 may extend through the flange 54. In FIG. 5, two lubricant holes 68 are shown; however, it is contemplated that a greater or lesser number of lubricant holes 68 may be provided. The lubricant holes 68 may be through holes that may extend from the first flange surface 60 to the second flange surface 62. The lubricant holes 68 may allow a lubricant, such as oil, to flow through the flange 54 to reach bearings and other moving components disposed inside the housing assembly 20. As is best shown in FIG. 2, the lubricant holes 68 may be disposed between the exterior surface 50 and the third flange surface 64 and may be substantially aligned with the interior surface 52 in one or more embodiments.

The rim surface 56 may extend around the axis 58 and may extend from an end of the first flange surface 60 toward the brake housing 42. As such, the rim surface 56 may be disposed further from the axis 58 than the dowel holes 66. A housing seal 72 may be disposed proximate the rim surface 56 to help keep lubricant in the housing assembly 20 and inhibit contaminants from passing between the axle housing 40 and the brake housing 42.

Figure 10:
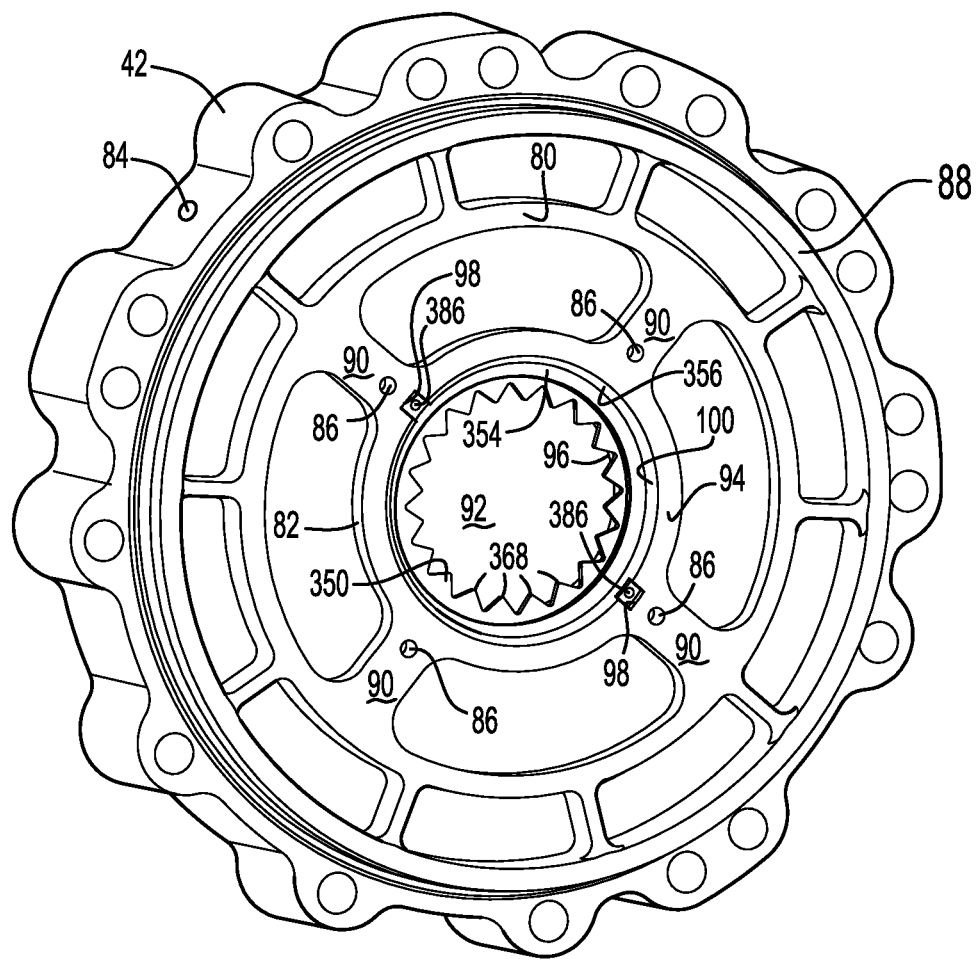
FIG. 10 is a perspective view of a brake housing and components associated with the sun gear positioning arrangement.

Referring to FIGS. 2 and 10, the brake housing 42 may be disposed between the axle housing 40 and the wheel bearing cage 44. The brake housing 42 may be assembled to the axle housing 40 and the wheel bearing cage 44 with one or more fasteners, such as bolts, that may extend through the corresponding fastener holes in the axle housing 40, brake housing 42, and wheel bearing cage 44. As such, the axle housing 40, brake housing 42, and wheel bearing cage 44 may be fixedly positioned with respect to each other. In at least one embodiment, the brake housing 42 may include an outer ring 80, an inner ring 82, a fluid passage 84, and one or more shoulder bolt holes 86.

The outer ring 80 may extend around the axis 58 and the inner ring 82. The outer ring 80 may facilitate mounting of the brake housing 42 to the axle housing 40 and the wheel bearing cage 44. For example, the outer ring 80 may include fastener holes that may be aligned with corresponding fastener holes in the axle housing 40 and the wheel bearing cage 44. The outer ring 80 may also include a positioning ring 88 that may extend around the axis 58 and may be received in the wheel bearing cage 44 to help position the wheel bearing cage 44 and facilitate assembly. Another housing seal 72 may be disposed proximate the positioning ring 88 to help to help keep lubricant in the housing assembly 20 and inhibit contaminants from passing between the brake housing 42 and the wheel bearing cage 44.

The inner ring 82 may be disposed closer to the axis 58 than the outer ring 80. The inner ring 82 may extend around the axis 58 and may be connected to the outer ring 80 by a plurality of webs 90. In at least one embodiment, the inner ring 82 may have an inner ring hole 92, a first face surface 94, a second face surface 96, one or more tab slots 98, an inner surface 100, a ring step surface 102, and a brake housing snap ring groove 104.

The inner ring hole 92 may be a through hole through which the axle shaft 22 may extend. The inner ring hole 92 may extend around the axis 58 and may receive a sun gear of the planetary gear set 24 and the sun gear positioning arrangement 38.

The first face surface 94 may face toward the planetary gear set 24. The first face surface 94 may be substantially planar and may be disposed substantially perpendicular to the axis 58 in one or more embodiments.

The second face surface 96 may be disposed on an opposite side of the inner ring 82 from the first face surface 94. As such, the second face surface 96 may face toward the brake assembly 36. The second face surface 96 may be substantially planar and may be disposed substantially perpendicular to the axis 58 in one or more embodiments. In addition, the second face surface 96 may extend further toward the axis 58 than the first face surface 94 in one or more embodiments.

One or more tab slots 98 may extend from the first face surface 94 toward the second face surface 96. In FIG. 10, two tab slots 98 are shown; however, it is contemplated that a greater or lesser number of tab slots 98 may be provided. The tab slots 98 may extend away from the axis 58 and toward the outer ring 80 and optionally may be aligned with and may extend toward a web 90. The tab slots 98 may receive tabs on a thrust washer of the sun gear positioning arrangement 38 and may help inhibit rotation of the thrust washer as will be discussed in more detail below.

The inner surface 100 may at least partially define the inner ring hole 92. The inner surface 100 may extend around the axis 58 and may extend from the first face surface 94 to the ring step surface 102.

Figure 8:
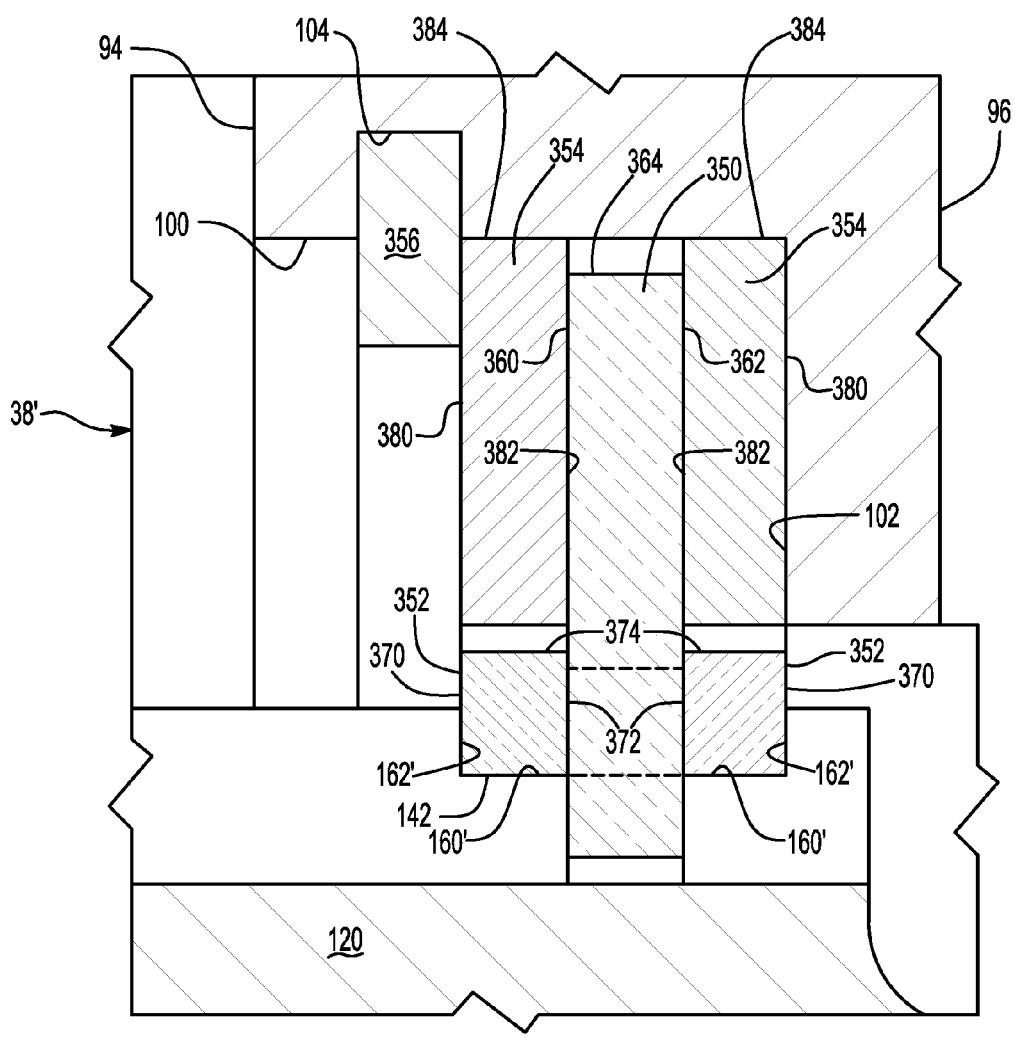
FIG. 8 is a magnified view of another sun gear positioning arrangement.

The ring step surface 102, which is best shown in FIG. 8, may be disposed between the first face surface 94 and the second face surface 96. Moreover, the ring step surface 102 may be disposed opposite the second face surface 96. The ring step surface 102 may extend from the inner surface 100 toward the axis 58. The ring step surface 102 may be substantially planar and may be disposed substantially perpendicular to the axis 58 in one or more embodiments.

The brake housing snap ring groove 104 may extend from the inner surface 100. For example, the brake housing snap ring groove 104 may extend away from the axis 58. The brake housing snap ring groove 104 may be axially positioned between the first face surface 94 and the ring step surface 102. The brake housing snap ring groove 104 may be configured to receive a snap ring that may help secure the sun gear positioning arrangement 38 as will be discussed in more detail below.

Referring again to FIG. 10, one or more shoulder bolt holes 86 may be provided with the brake housing 42. In FIG. 10, four shoulder bolt holes 86 are shown; however, it is contemplated that a greater or lesser number of shoulder bolt holes 86 may be provided. The shoulder bolt holes 86 may facilitate mounting of a shoulder bolt, which may be provided with the brake assembly 36, to the brake housing 42. The shoulder bolt holes 86 may be provided in the inner ring 82, the webs 90, or both.

Figure 3:
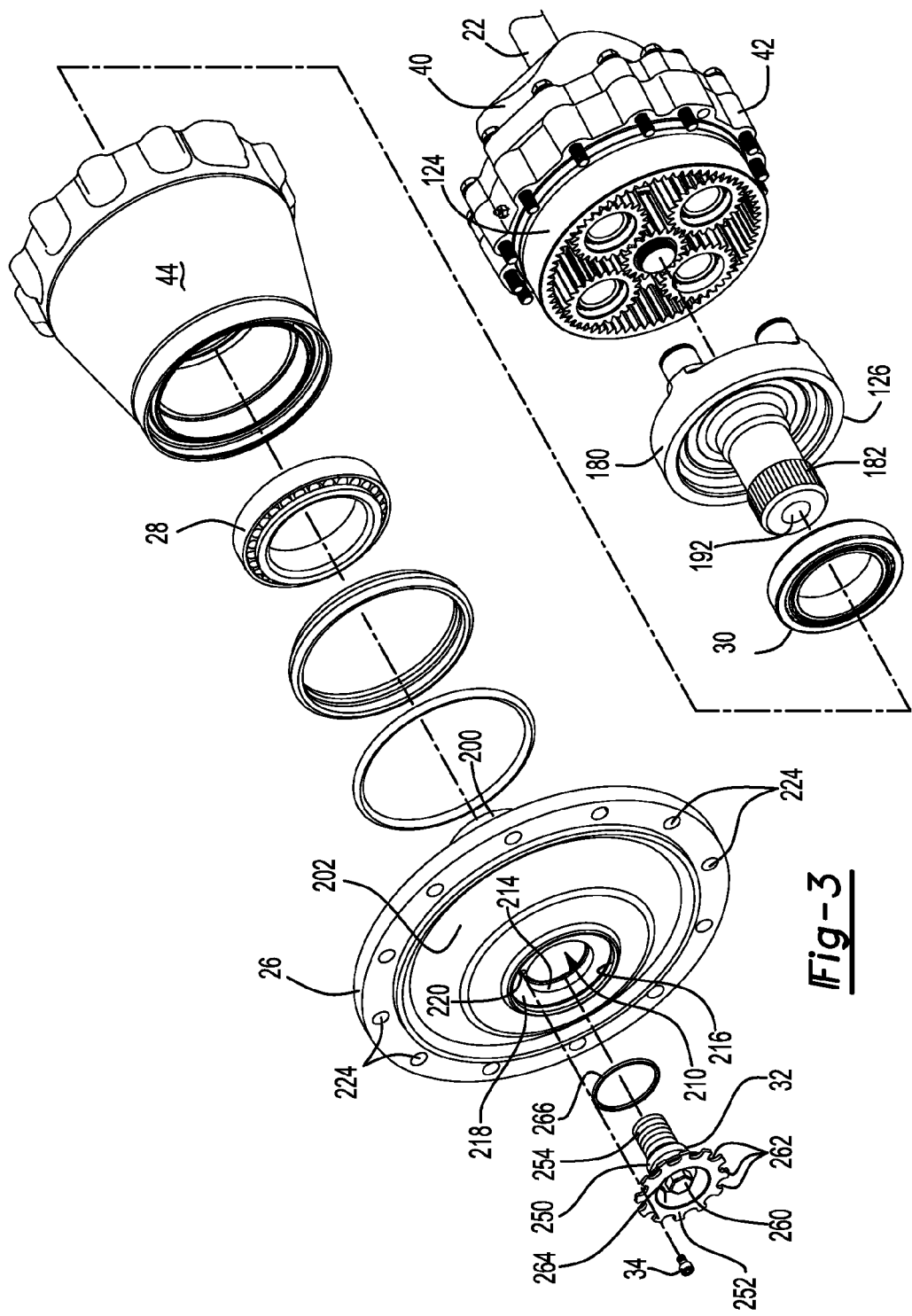
FIGS. 3-5 are exploded views of portions of the axle assembly.

Referring to FIGS. 2 and 3, the wheel bearing cage 44 may be disposed on the brake housing 42 and may be disposed at an end of the housing assembly 20. The wheel bearing cage 44 may extend around the axis 58 and may have a tapered exterior surface that may become narrower or may extend closer to the axis 58 in a direction that extends away from the brake housing 42. The wheel bearing cage 44 may receive and facilitate mounting of the first roller bearing assembly 28 and the second roller bearing assembly 30. In addition, the wheel bearing cage 44 may define a cavity that may receive a planet carrier of the planetary gear set 24 and a tubular portion of the output flange 26 as will be discussed in more detail below.

Referring to FIG. 2, the axle shaft 22 may transmit torque from the differential to a planetary gear set 24. For example, the axle shaft 22 may extend along and may be rotated about an axis 58 by the differential. The axle shaft 22 may have a first end and a second end. The first end may be operatively connected to the planetary gear set 24. The second end may be disposed opposite the first end and may be operatively connected to the differential. In at least one embodiment, the axle shaft 22 may include a first axle shaft snap ring groove 110 and a second axle shaft snap ring groove 112.

The first axle shaft snap ring groove 110 may be disposed proximate the first end of the axle shaft 22. The first axle shaft snap ring groove 110 may extend continuously around the axis 58 and may receive a first axle shaft snap ring 114.

The second axle shaft snap ring groove 112 may be disposed proximate the brake assembly 36 and may be disposed between the first axle shaft snap ring groove 110 and the second end of the axle shaft 22. The second axle shaft snap ring groove 112 may extend continuously around the axis 58 and may receive a second axle shaft snap ring 116.

Figure 4:
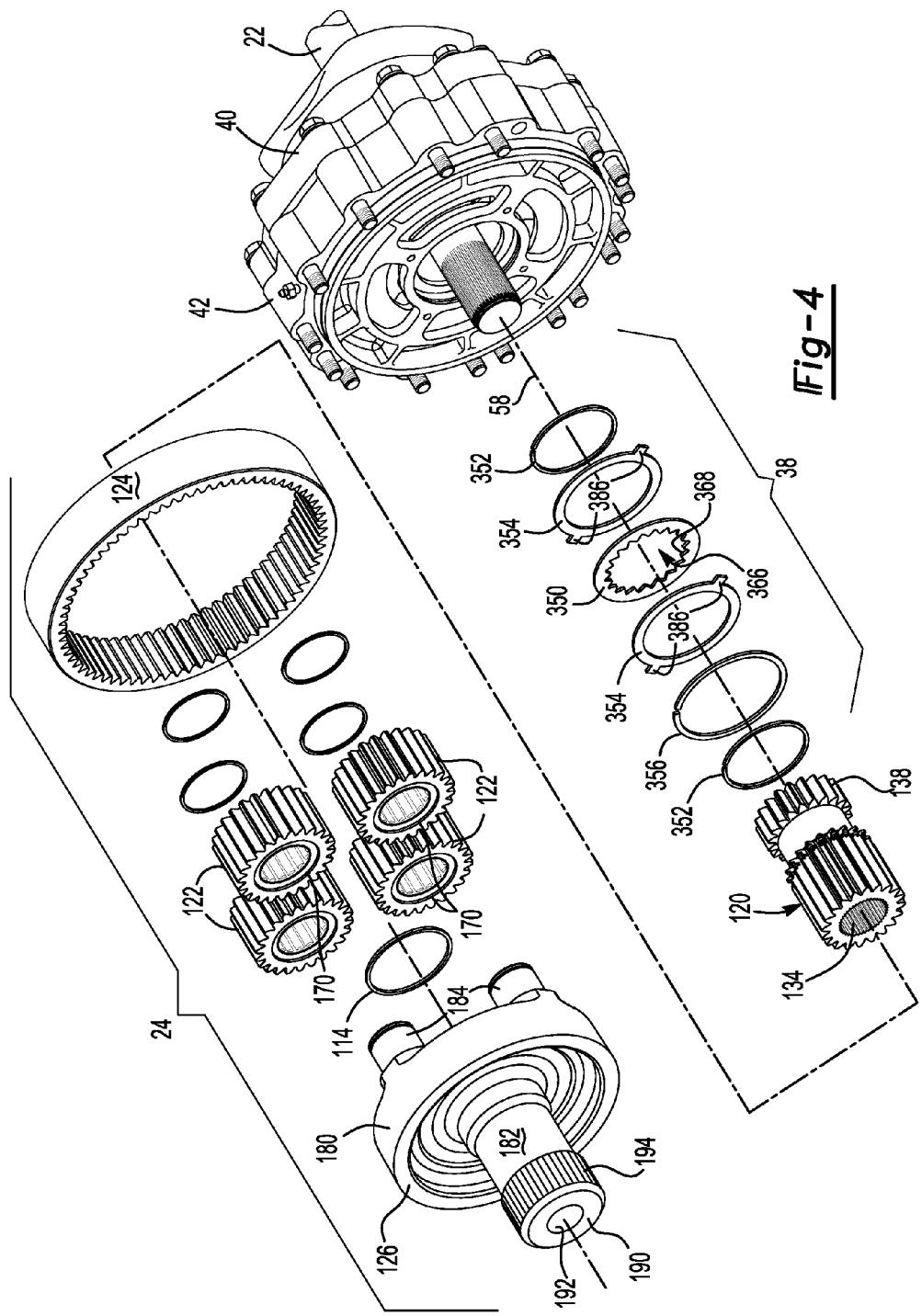

Referring to FIGS. 2 and 4, the planetary gear set 24 may be disposed in the housing assembly 20. For instance, the planetary gear set 24 may be received in the wheel bearing cage 44. The planetary gear set 24 may be configured to provide a desired gear reduction ratio and increase torque provided to a wheel 14. In at least one embodiment, the planetary gear set 24 may include a sun gear 120, a plurality of planet pinions 122, a ring gear 124, and a planet carrier 126.

Figure 9:
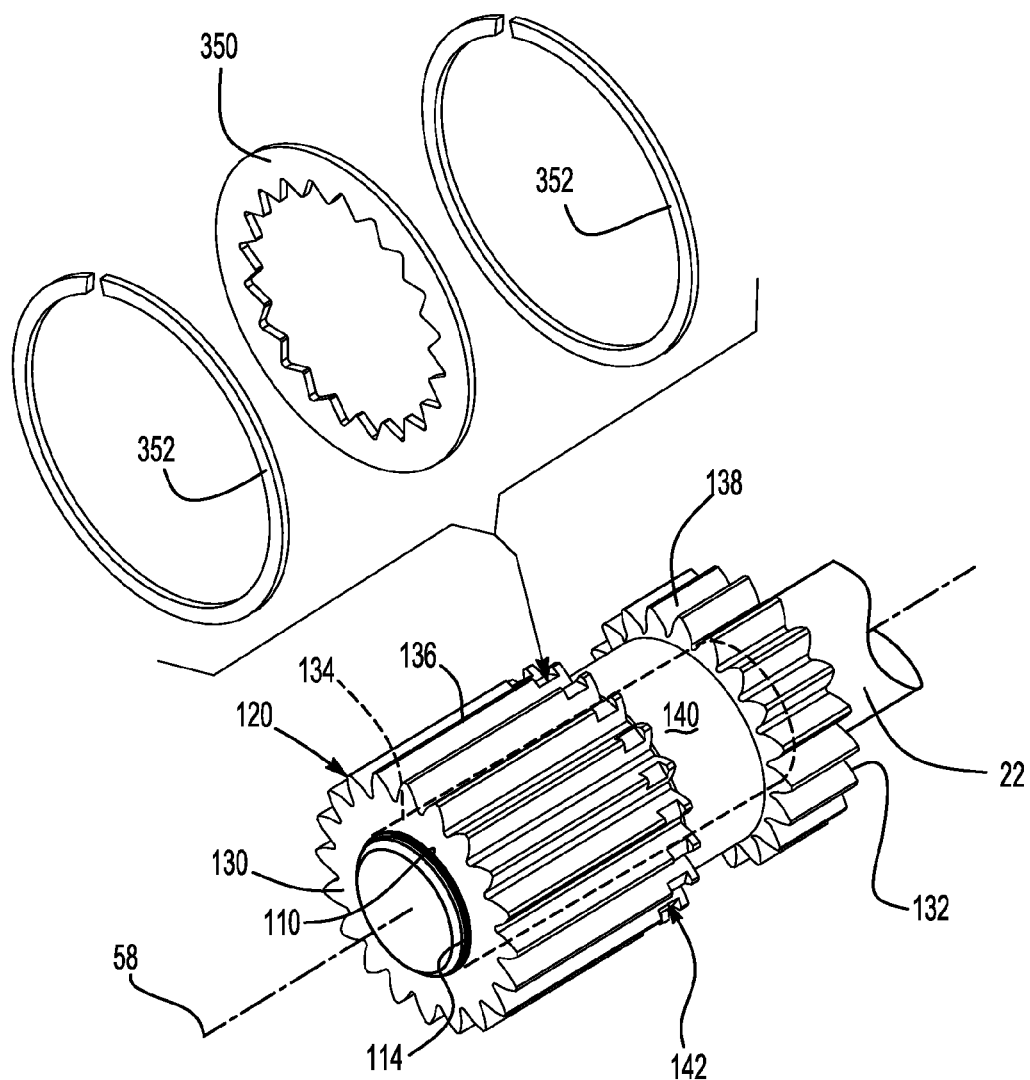
FIG. 9 is a perspective view of a sun gear and components associated with the sun gear positioning arrangement.

The sun gear 120 may be disposed proximate the center of the planetary gear set 24. The sun gear 120 may also be disposed proximate and may engage the axle shaft 22 such that the sun gear 120 may rotate about the axis 58 with the axle shaft 22. As is best shown in FIG. 9, the sun gear 120 may include a first end 130, a second end 132, a hole 134, a first set of teeth 136, a second set of teeth 138, an intermediate surface 140, and at least one groove 142.

The first end 130 of the sun gear 120 may face toward the planet carrier 126. In addition, the first end 130 may be disposed proximate and may engage the first axle shaft snap ring 114. As such, the first axle shaft snap ring 114 may limit movement of the sun gear 120 in an axial direction along the axis 58 toward the planet carrier 126, or to the left from the perspective shown in FIG. 2.

The second end 132 of the sun gear 120 may face toward the differential and may be disposed proximate the brake assembly 36. The second end 132 may be disposed proximate and may engage the second axle shaft snap ring 116. As such, the second axle shaft snap ring 116 may limit movement of the sun gear 120 in an axial direction toward the differential, or to the right from the perspective shown in FIG. 2.

The hole 134 may extend through the sun gear 120. For example, the hole 134 may extend from the first end 130 to the second end 132. The hole 134 may receive the axle shaft 22. A spline may be provided in hole 134. The teeth of the spline may extend generally parallel to the axis 58 and may engage and mate with a similarly configured spline disposed on the exterior surface of the axle shaft 22 to inhibit rotation of the sun gear 120 with respect to the axle shaft 22.

The first set of teeth 136 may be disposed proximate the first end 130 of the sun gear 120. The first set of teeth 136 may be disposed opposite the hole 134 and may be arranged around and may extend away from the axis 58. The members of the first set of teeth 136 may extend substantially parallel to each other and may extend substantially parallel to the axis 58. The first set of teeth 136 may engage and mesh with the planet pinions 122.

The second set of teeth 138 may be disposed proximate the second end 132 of the sun gear 120. In at least one embodiment, the second set of teeth 138 may differ from the first set of teeth. The second set of teeth 138 may be disposed opposite the hole 134 and may be arranged around and may extend away from the axis 58. In addition, the members of the second set of teeth may extend substantially parallel to each other and may extend substantially parallel to the axis 58. The second set of teeth 138 may engage one or more friction discs that may be provided with the brake assembly 36 as will be discussed in more detail below.

The intermediate surface 140 may be disposed opposite the hole 134 and may extend continuously around the axis 58. The intermediate surface 140 extend from the first set of teeth 136 to the second set of teeth 138. As such, the intermediate surface 140 may be free of teeth and may separate the first set of teeth 136 from the second set of teeth 138. It is also contemplated that the intermediate surface 140 may be omitted in one or more embodiments and a single set of teeth may be provided with the sun gear 120.

Figure 7:
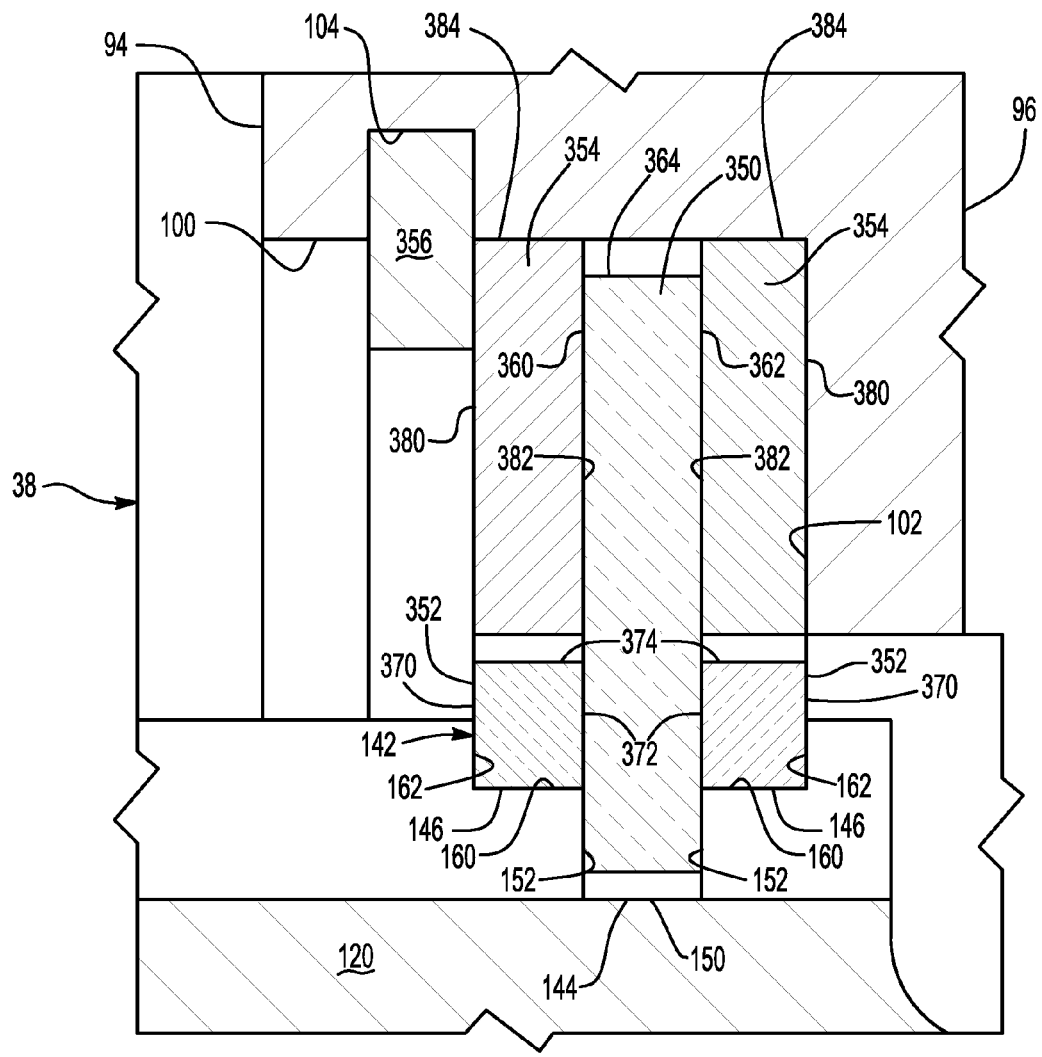
FIG. 7 is a magnified view of a portion of FIG. 2 showing components associated with a sun gear positioning arrangement.

Referring to FIGS. 7-9, the groove 142 may extend continuously around the axis 58. The groove 142 may extend into or may be provided in the first set of teeth 136. As such, the groove 142 may intersect the members of the first set of teeth 136. The groove 142 may be configured as a single groove or may have multiple groove portions. For example, the groove 142 may have a washer groove portion 144 and one or more snap ring groove portions 146, such as is shown in FIG. 7.

The washer groove portion 144 may be at least partially defined by a washer groove bottom surface 150 and at least one washer groove side surface 152.

The washer groove bottom surface 150 may be disposed at the bottom of the washer groove portion 144. The washer groove bottom surface 150 may be disposed at a substantially constant radial distance from the axis 58.

At least one washer groove side surface 152 may extend from the washer groove bottom surface 150. In the embodiment shown, a pair of washer groove side surfaces 152 are provided that are disposed opposite each other and extend from opposite ends of the washer groove bottom surface 150. The washer groove side surfaces 152 may be disposed in and may be defined by members of the first set of teeth 136. In addition, the washer groove side surfaces 152 may extend away from the axis 58 and may be disposed substantially perpendicular to the axis 58 in one or more embodiments.

One or more snap ring grooves 146 may be disposed adjacent to the washer groove portion 144. In FIGS. 7 and 9, two snap ring grooves 146 are provided that are disposed on opposite sides of the washer groove portion 144. The snap ring grooves 146 may extend continuously around the axis 58 and may extend into or may be provided in the first set of teeth 136. As such, the snap ring grooves 146 may intersect the members of the first set of teeth 136 adjacent to the washer groove portion 144. A snap ring groove portion 146 may be at least partially defined by a snap ring groove bottom surface 160 and a snap ring groove side surface 162.

The snap ring groove bottom surface 160 may be disposed at the bottom of the snap ring groove portion 146. The snap ring groove bottom surface 160 may extend from an end of the washer groove side surface 152 such that the snap ring groove bottom surface 160 may extend away from the washer groove portion 144. Moreover, the snap ring groove bottom surface 160 may extend from the washer groove side surface 152 to the snap ring groove side surface 162. The snap ring groove bottom surface 160 may be disposed at a substantially constant radial distance from the axis 58. In addition, the snap ring groove bottom surface 160 may be disposed at a greater radial distance from the axis 58 than the washer groove bottom surface 150. As such, the washer groove portion 144 may have a greater depth than the snap ring groove portion 146 and may be disposed closer to the axis 58 than the snap ring groove portion 146 in one or more embodiments.

The snap ring groove side surface 162 may extend from the snap ring groove bottom surface 160. For example, the snap ring groove side surface 162 may extend from an end of the snap ring groove bottom surface 160 in a direction that may extend away from the axis 58. The snap ring groove side surfaces 162 may be defined by members of the first set of teeth 136.

Referring to FIG. 8, a groove 142 that is configured as a single groove is shown. As such, the groove 142 may not have a washer groove portion and one or more snap ring groove portions that may have bottom surfaces that are disposed at different distances from the axis 58. In such a configuration, the groove 142 may be at least partially defined by a bottom surface 160' and a groove side surface 162'.

The bottom surface 160' may be disposed at the bottom of the groove 142 and may extend from one groove side surface 162' to another groove side surface 162'. The bottom surface 160' may be disposed at a substantially constant radial distance from the axis 58. A groove side surface 162' may extend from the snap ring groove bottom surface 160'. For example, a groove side surfaces 162' may extend from each end of the bottom surface 160' in a direction that may extend away from the axis 58. The groove side surfaces 162 may be defined by members of the first set of teeth 136.

Referring to FIGS. 2 and 4, the planet pinions 122 may be spaced apart from each other and may be rotatably disposed between the sun gear 120 and the ring gear 124. Each planet pinion 122 may have a planet pinion hole 170 and a set of teeth. The planet pinion hole 170 may be a through hole that may extend through the planet pinion 122. The set of teeth may be disposed opposite the planet pinion hole 170 and on an exterior surface or outside diameter of the planet pinion 122. The set of teeth may mesh with teeth on the sun gear 120 and teeth on the ring gear 124. Each planet pinion 122 may be configured to rotate about a different planet pinion axis. The planet pinion axes may extend substantially parallel to the axis 58.

The ring gear 124 may extend around the axis 58 and may be disposed between the wheel bearing cage 44 and the planet pinions 122. In addition, the ring gear 124 may include a plurality of teeth that may extend toward the axis 58 and may mesh with teeth on the planet pinions 122. The ring gear 124 may be fixedly positioned with respect to the housing assembly 20 and the axis 58. For example, the ring gear 124 may be disposed in the housing assembly 20 such that an outside circumference of the ring gear 124 may be disposed proximate and may engage the wheel bearing cage 44. The ring gear 124 may be disposed between the brake housing 42 and the wheel bearing cage 44 such that the brake housing 42 and the wheel bearing cage 44 may cooperate to inhibit axial movement of the ring gear 124.

The planet carrier 126 may be coupled to the planet pinions 122 and may be configured to rotate about the axis 58. In addition, the planet carrier 126 may be received in and may not engage the wheel bearing cage 44. The planet carrier 126 may be provided in various configurations. In at least one embodiment, the planet carrier 126 may have a body portion 180 and a shaft portion 182.

The body portion 180 may include a plurality of hubs 184 that may be received in corresponding planet pinion holes 170 to help support and position a corresponding planet pinion 122. A roller bearing may be disposed in the planet pinion hole 170 between a hub 184 and a corresponding planet pinion 122 to facilitate rotation of the planet pinion 122 with respect to the hub 184. The body portion 180 may be disposed around the axis 58 and may extend further from the axis 58 than the shaft portion 182.

The shaft portion 182 may extend along the axis 58 and may be integrally formed with the body portion 180. The shaft portion 182 may extend from the body portion 180 in a direction that extends away from the axle shaft 22 and may be received in the output flange 26. The shaft portion 182 may have an end surface 190, a threaded hole 192, and an outer surface 194.

The end surface 190 may be disposed at an end of the shaft portion 182 that may be disposed opposite the body portion 180. The end surface 190 may be disposed substantially perpendicular to the axis 58 in one or more embodiments.

The threaded hole 192 may extend along the axis 58 from the end surface 190 toward the axle shaft 22. The threaded hole 192 may have one or more threads that may mate with a threaded portion of the preload bolt 32 as will be discussed in more detail below.

The outer surface 194 may extend from the end surface 190 and may be disposed opposite the threaded hole 192. The outer surface 194 may be disposed proximate and may engage the output flange 26. For example, one or more splines or splined regions may be provided on the outer surface 194 that may mate with one or more corresponding splines on the output flange 26 to inhibit rotation of the output flange 26 with respect to the planet carrier 126. As such, the output flange 26 may rotate about the axis 58 with the planet carrier 126.

Referring to FIGS. 2 and 3, the output flange 26 may facilitate mounting of a wheel 14 and may be disposed on and may engage the planet carrier 126. In addition, the output flange 26 may be partially received in the wheel bearing cage 44 such that the output flange 26 may be spaced apart from and may not engage the wheel bearing cage 44. In at least one embodiment, the output flange 26 may include a tubular portion 200 and a flange portion 202.

The tubular portion 200 may be at least partially disposed in the housing assembly 20. The tubular portion 200 may extend around the axis 58 and may at least partially define an output flange hole 210. The output flange hole 210 may extend through the output flange 26 and may receive the shaft portion 182 of the planet carrier 126. As such, the tubular portion 200 may be disposed on and may engage the shaft portion 182. The tubular portion 200 may have an exterior surface that may be disposed opposite the output flange hole 210. The exterior surface may support the first roller bearing assembly 28 and the second roller bearing assembly 30. As is best shown in FIG. 2, the tubular portion 200 may have a first inner surface 212 that may extend around the axis 58. The first inner surface 212 may at least partially define the output flange hole 210 and may be spaced apart from and may not engage the preload bolt 32.

The flange portion 202 may be disposed outside of the housing assembly 20 and may be integrally formed with the tubular portion 200. The flange portion 202 may be disposed at an end of the tubular portion 200 and may extend away from the axis 58. The flange portion 202 may be spaced apart from and may not engage the housing assembly 20. For instance, a gap may be provided between the flange portion 202 and the wheel bearing cage 44 to permit axial and rotational movement of the output flange 26 and to facilitate application of a preload force on at least one of the first roller bearing assembly 28 and the second roller bearing assembly 30 as will be discussed in more detail below.

The flange portion 202 may at least partially define the output flange hole 210 and may receive the preload bolt 32. In at least one embodiment, the flange portion 202 may include a second inner surface 214, a third inner surface 216, a step surface 218, a locking fastener opening 220, an rim 222, and a plurality of wheel stud holes 224.

The second inner surface 214 may extend around the axis 58 and may at least partially define the output flange hole 210. The second inner surface 214 may be axially positioned between the first inner surface 212 and the third inner surface 216. The second inner surface 214 may be disposed further from the axis 58 than the first inner surface 212.

The third inner surface 216 may extend around the axis 58 and may at least partially define the output flange hole 210. The third inner surface 216 may be disposed further from the axis 58 than the second inner surface 214. As such, the third inner surface 216 may have a larger diameter than the second inner surface 214.

The step surface 218 may extend between the second inner surface 214 and the third inner surface 216. For example, the step surface 218 may extend from the second inner surface 214 to the third inner surface 216. In addition, the step surface 218 may be disposed substantially perpendicular to the axis 58 in one or more embodiments.

One or more locking fastener openings 220 may be provided to receive the locking fastener 34. The locking fastener opening 220 may be disposed in the flange portion 202 proximate the preload bolt 32. For example, the locking fastener opening 220 may be disposed in the step surface 218; however, it is also contemplated that the locking fastener opening 220 may be disposed in other locations, such as in the third inner surface 216. In at least one embodiment, the locking fastener opening 220 may be a threaded hole that may receive and retain the locking fastener 34. Multiple locking fastener openings 220 may be provided that may be arranged around the flange portion 202.

The rim 222 may be disposed opposite the output flange hole 210 and may extend away from the axis 58. The rim 222 may engage the first roller bearing assembly 28 as will be discussed in more detail below. In at least one embodiment, the rim 222 may be disposed opposite the first inner surface 212.

The wheel stud holes 224 may facilitate mounting of a wheel 14 to the output flange 26. The wheel stud holes 224 may be through holes that may be arranged around the axis 58. Each wheel stud hole 224 may receive a fastener, such as a wheel stud 226 that may extend through a corresponding hole on the wheel 14. A lug nut 228 may be attached to the wheel stud 226 to secure the wheel 14 to the output flange 26.

The first roller bearing assembly 28 may be disposed in the housing assembly 20 and may rotatably support the output flange 26. For example, the first roller bearing assembly 28 may extend between the output flange 26 and the wheel bearing cage 44 and may be axially positioned near an end of the wheel bearing cage 44 that may be disposed opposite the brake housing 42. The first roller bearing assembly 28 may include a plurality of rolling elements 230, such as balls or rollers, that may be disposed between a first inner race 232 and a first outer race 234. The first inner race 232 may be disposed proximate and may engage the output flange 26. For instance, the first inner race 232 may be disposed proximate and may engage the rim 222 of the output flange 26 such that the output flange 26 may exert a preload force against the first inner race 232 when the preload bolt 32 is tightened as will be discussed in more detail below. The first outer race 234 may be disposed proximate and may engage the wheel bearing cage 44 such that the wheel bearing cage 44 may inhibit movement of the first outer race 234 in an axial direction that may extend toward the axle housing 40, or to the right from the perspective shown in FIG. 2.

The second roller bearing assembly 30 may be disposed in the housing assembly 20 and may also rotatably support the output flange 26. For example, the second roller bearing assembly 30 may extend between the output flange 26 and the wheel bearing cage 44 and may be axially positioned near an end of the output flange 26 that may be disposed near the planet carrier 126. The second roller bearing assembly 30 may include a plurality of rolling elements 240, such as balls or rollers, that may be disposed between a second inner race 242 and a second outer race 244. The second inner race 242 may be disposed proximate and may engage the output flange 26 and the body portion 180 of the planet carrier 126. As such, the body portion 180 may help exert a preload force against the second inner race 242 when the preload bolt 32 is tightened as will be discussed in more detail below. The second outer race 244 may be disposed proximate and may engage the wheel bearing cage 44 such that the wheel bearing cage 44 may inhibit movement of the second outer race 244 in an axial direction that may extend away from the axle housing 40, or to the left from the perspective shown in FIG. 2.

The preload bolt 32 may be partially or completely received in the output flange hole 210 and may couple the output flange 26 to the planet carrier 126. In at least one embodiment, the preload bolt 32 may have a preload bolt body 250 and a preload bolt flange 252.

The preload bolt body 250 may extend along the axis 58 and may be received in the output flange hole 210. The preload bolt body 250 may have a threaded portion 254 that may be received in the threaded hole 192 of the planet carrier 126. The threaded portion 254 may have one or more threads that may mate with one or more threads that may be provided in the threaded hole 192.

The preload bolt flange 252 may be integrally formed with the preload bolt body 250. The preload bolt flange 252 may be received in the output flange hole 210 may exert force on the output flange 26. For instance, the preload bolt flange 252 may engage and may exert force on the step surface 218 of the output flange 26. In addition, the preload bolt flange 252 may be spaced apart from the third inner surface 216 of the output flange 26. In at least one embodiment, the preload bolt flange 252 may include an engagement feature 260 and a set of preload bolt flange openings 262.

The engagement feature 260 may allow a tool to apply torque to rotate the preload bolt 32 about the axis 58. The engagement feature 260 may have any suitable configuration, such as a male configuration, female configuration or combinations thereof. In FIGS. 2 and 3, the engagement feature 260 has a male configuration that may be received in a tool, such as a socket or wrench. The engagement feature 260 may be received in a recess 264 in the preload bolt 32. As such, the engagement feature 260 may not protrude from an end surface of the preload bolt 32 and may be completely disposed in the output flange hole 210 in one or more embodiments.

The set of preload bolt flange openings 262 may extend through the preload bolt flange 252. The preload bolt flange openings 262 may be arranged around the axis 58 and may be spaced apart from each other. The preload bolt flange openings 262 may have any suitable configuration. In the embodiment shown in FIG. 3, the preload bolt flange openings 262 are generally semicircular and extend from an outside circumferential surface of the preload bolt flange 252 toward the axis 58. Alternatively, the preload bolt flange openings 262 may be configured as through holes that may be completely defined with in the preload bolt flange 252 and may be spaced apart from the outside circumferential surface of the preload bolt flange 252.

A preload bolt seal 266 may be disposed between the preload bolt 32 and the output flange 26. The preload bolt seal 266 may help retain lubricant inside the axle assembly 10 and may inhibit contaminants from entering at least a portion of the output flange hole 210. For example, the preload bolt seal 266 may be configured as an O-ring that may extend around the axis 58. The preload bolt seal 266 may seal axially, radially, or combinations thereof. The preload bolt seal 266 may be disposed between the second inner surface 214 of the output flange 26 and the preload bolt 32. As such, the preload bolt seal 266 may be disposed between the preload bolt 32 and the second inner surface 214 and may engage the second inner surface 214.

The locking fastener 34 may inhibit rotation of the preload bolt 32 about the axis 58. For example, the locking fastener 34 may be inserted into or received in a preload bolt flange opening 262 that may be proximately aligned with the locking fastener opening 220 after the preload bolt 32 is tightened to exert a desired preload force on at least one of the first roller bearing assembly 28 and the second roller bearing assembly 30. As such, the locking fastener 34 may engage the preload bolt 32 and may be coupled to and may engage the output flange 26 to inhibit rotation of the preload bolt 32. The locking fastener 34 may be offset from the axis 58 and may not extend along the axis 58. The locking fastener 34 may have any suitable configuration. For instance, the locking fastener 34 may be a threaded fastener, such as a bolt or screw.

A preload force may be applied to the first roller bearing assembly 28 and the second roller bearing assembly 30 by rotating the preload bolt 32. Tightening the preload bolt 32 into the threaded hole 192 in the planet carrier 126 may cause the preload bolt flange 252 to exert force on the output flange 26 in an axial direction that may extend to the right from the perspective shown in FIG. 2. The rim 222 of the output flange 26 may then exert force on the first inner race 232 of the first roller bearing assembly 28 in the same direction. Tightening the preload bolt 32 may also pull the planet carrier 126 in an axial direction toward the output flange 26 or to the left from the perspective shown in FIG. 2. The body portion 180 of the planet carrier 126 may then exert force on the second inner race 242 of the second roller bearing assembly 30 in the same direction. As such, the preload bolt 32 may exert a preload force that may bias the first roller bearing assembly 28 toward the second roller bearing assembly 30.

The preload bolt 32 may provide axial flexibility that may allow a more stable preload force to be applied against one or more roller bearing assemblies. For example, the preload bolt 32 may cooperate with the output flange 26 and the planet carrier 126 to exert a stable or relatively constant preload force that may accommodate "settling" of the axle assembly 10 due to operation and initial wear. Preload force may decrease significantly due to settling in other axle assembly configurations. A preload force that remains substantially stable over time may reduce deflection with respect to the axis 58 and may increase operational life of the roller bearings and associated gears of the axle assembly 10. In addition, the preload bolt 32 may allow the axial length of the shaft portion 182 of the planet carrier 126 to be reduced, which may reduce weight. The preload bolt 32 may also eliminate the need for a separate wheel end cover that may otherwise be provided to cover and seal against the output flange 26 to retain lubricant inside the axle assembly 10.

Figure 6:
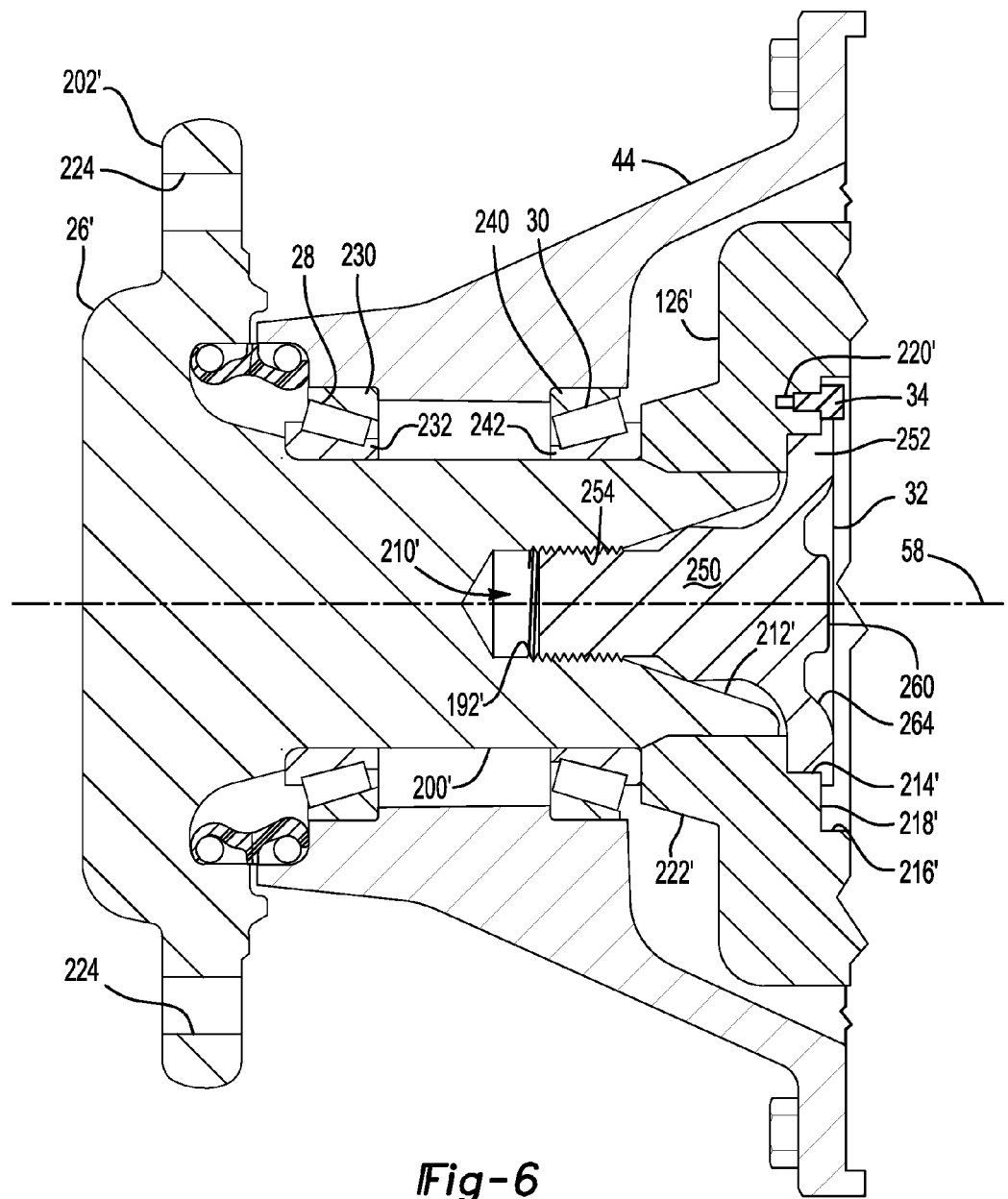
FIG. 6 is a section view showing alternate positioning of a preload bolt.

Referring to FIG. 6, another preload bolt configuration is shown. In FIG. 6, the preload bolt 32 may positioned inside the wheel bearing cage 44 between the output flange 26' and the planet carrier 126'. In such a position, the preload bolt seal 266 may be omitted.

The output flange 26' may have a tubular portion 200' and a flange portion 202'. The tubular portion 200' may include the output flange hole 210'. The output flange hole 210' may extend partially through the tubular portion 200' toward the flange portion 202' and may have a first inner surface 212'. The output flange hole 210' may have a threaded region or threaded hole 192' that may have one or more threads that may mate with the threaded portion 254 of the preload bolt 32.

The first inner surface 212' may be similar to the first inner surface 212, but may extend toward the flange portion 202'. As such, the first inner surface 212' may extend around the axis 58 and may at least partially define the output flange hole 210'.

The planet carrier 126' may be similar to the planet carrier 126 previously described, but may also include a second inner surface 214', a third inner surface 216', a step surface 218', at least one locking fastener opening 220', and a rim 222'.

The second inner surface 214' may be similar to the second inner surface 214, but may be provided on the planet carrier 126'. As such, the second inner surface 214' may extend around the axis 58 and may at least partially define a hole that receives the preload bolt 32. The second inner surface 214' may be disposed further from the axis 58 than the first inner surface 212'.

The third inner surface 216' may be similar to the third inner surface 216, but may be provided on the planet carrier 126'. As such, the third inner surface 216' may extend around the axis 58 and may at least partially define a hole that receives the preload bolt 32. The third inner surface 216' may be disposed further from the axis 58 than the second inner surface 214'.

The step surface 218' may be similar to the step surface 218, but may be provided on the planet carrier 126'. As such, the step surface 218' may extend from the second inner surface 214' to the third inner surface 216'.

One or more locking fastener openings 220' may be configured to receive the locking fastener 34. The locking fastener openings 220' may be disposed on the planet carrier 126' proximate the preload bolt 32, such as in the step surface 218' or the third inner surface 216'.

The rim 222' may be similar to the rim 222, but may be provided on the planet carrier 126'. As such, the rim 222' may be disposed opposite the output flange hole 210', may extend away from the axis 58', and may engage the second roller bearing assembly 30.

A preload force may be applied to the first roller bearing assembly 28 and the second roller bearing assembly 30 by rotating the preload bolt 32. Tightening the preload bolt 32 into the threaded hole 192 in the output flange 26' may cause the preload bolt flange 252 to exert force on the planet carrier 126' in an axial direction or to the left from the perspective shown. The rim 222' may then exert force on the second inner race 242 of the second roller bearing assembly 30 in the same direction. Tightening the preload bolt 32 may also exert force on the output flange 26' in an axial direction to the right from the perspective shown. The body portion 180 of the planet carrier 126 may then exert force on the first inner race 232 of the first roller bearing assembly 28 in the same direction. As such, the preload bolt 32 may exert a preload force that may bias the first roller bearing assembly 28 toward the second roller bearing assembly 30.

Referring to FIGS. 2 and 5, the brake assembly 36 may be adapted to slow or inhibit rotation of the sun gear 120 and an associated wheel 14 about the axis 58. The brake assembly 36 may be a wet disc brake assembly that may be disposed inside the housing assembly 20. In at least one embodiment, the brake assembly 36 may include a disc pack 270, one or more dowels 272, a piston 274, one or more shoulder bolts 276, and one or more biasing members 278.

The disc pack 270 may be received in the brake housing 42. For example, the disc pack 270 may be disposed between the flange 54 and the piston 274. The disc pack 270 may include one or more friction discs 280 and one or more stationary discs 282.

One or more friction discs 280 may be disposed on the sun gear 120 and may extend away from the axis 58 and past the third flange surface 64 of the flange 54. The friction discs 280 may have a hole that may receive the second set of teeth 138 on the sun gear 120. The hole in a friction disc 280 may have a toothed profile that may engage and mate with the second set of teeth 138 such that the friction disc 280 rotates about the axis 58 with the sun gear 120.

One or more stationary discs 282 may be disposed adjacent to a friction disc 280. The stationary discs 282 may be spaced apart from each other such that a friction disc 280 is disposed between adjacent stationary discs 282. The stationary discs 282 may extend from the brake housing 42 toward the axis 58 and may not rotate about the axis 58. As such, the stationary discs 282 may have an inside circumferential surface 290 that may face toward and may extend around the axis 58. As is best shown in FIG. 2, the inside circumferential surface 290 and the third flange surface 64 of the flange 54 of the axle housing 40 may be disposed at a substantially common radial distance from the axis 58 in one or more embodiments. As is best shown in FIG. 5, the stationary discs 282 may have one or more dowel grooves 292 that may at least partially receive a corresponding dowel 272.

One or more dowels 272 may extend from the axle housing 40 to the brake housing 42. The axle housing 40 and the brake housing 42 may cooperate to hold each dowel 272 in a fixed position such that the dowels 272 may not rotate about the axis 58. Each dowel 272 may be received in a corresponding dowel hole 66 of the flange 54 and may be disposed in corresponding dowel hole or slot in the brake housing 42.

The piston 274 may be received in the brake housing 42 between the planetary gear set 24 and the disc pack 270. The piston 274 may be configured to move in an axial direction with respect to the brake housing 42 between a retracted position and an extended position as will be discussed in more detail below. A first piston seal 300 and a second piston seal 302 may be disposed between the piston 274 and the brake housing 42 such that the outlet of the fluid passage 84 in the brake housing 42 may be disposed between the first piston seal 300 and the second piston seal 302. As is best shown in FIG. 5, the piston 274 may be configured as a ring that may extend around the axis 58 and may have a set of ribs 304 and a set of shoulder bolt openings 306.

The set of ribs 304 may extend toward the disc pack 270. The set of ribs 304 may be arranged around the axis 58 such that the ribs 304 may be spaced apart from each other and may extend toward the disc pack 270. The ribs 304 may be disposed substantially perpendicular to the axis 58 and may extend radially with respect to the axis 58 in one or more embodiments. Each rib may have a contact surface 310 and an inner rib surface 312.

The contact surface 310 may engage the disc pack 270. The contact surface 310 may be substantially planar and may be disposed substantially perpendicular to the axis 58.

The inner rib surface 312 may face toward the axis 58 and may extend from an end of the contact surface 310 away from the disc pack 270. The inner rib surface 312 may be disposed substantially parallel to the axis 58 in one or more embodiments. The inner rib surface 312 may be disposed opposite the flange 54 on the axle housing 40 in one or more embodiments.

The set of shoulder bolt openings 306 may be aligned with a corresponding shoulder bolt hole 86 on the brake housing 42 and a corresponding shoulder bolt 276. Each shoulder bolt 276 may extend through the corresponding shoulder bolt opening 306 such that the piston 274 may move axially with respect to the shoulder bolt 276. The shoulder bolt openings 306 may be disposed closer to the axis 58 than the ribs 304.

One or more shoulder bolts 276 may be fixedly disposed on the brake housing 42. For example, a shoulder bolt 276 may be received in the shoulder bolt hole 86 in the brake housing 42. The shoulder bolts 276 may be arranged around the axis 58 and may extend substantially parallel to the axis 58 in one or more embodiments. The shoulder bolts 276 may extend through the piston 274. For example, a shoulder bolt 276 may extend through a shoulder bolt opening 306 and toward the disc pack 270. Each shoulder bolt 276 may have an enlarged head 320 that may be disposed opposite the brake housing 42. The enlarged head 320 may extend into the disc pack 270. For example, the enlarged head 320 may be disposed in the hole in a stationary disc 282 between the inside circumferential surface 290 of a stationary disc 282 and the sun gear 120 as is best shown in FIG. 2.

A biasing member 278 may be disposed on each shoulder bolt 276 between the disc pack 270 and the piston 274. The biasing member 278 may extend between the piston 274 and the enlarged head 320 of the shoulder bolt 276. The biasing member 278 may exert a biasing force on the piston 274 that may actuate the piston 274 away from the flange 54 of the axle housing 40 and toward the brake housing 42 when sufficient fluid pressure is not exerted on the opposite side of the piston 274. As such, the biasing member 278 may bias the piston 274 to the left from the perspective shown in FIG. 2.

The pressurized fluid source 330 may be associated with the axle assembly 10. The pressurized fluid source 330 may be configured to supply or store a volume of a pressurized fluid, such as hydraulic fluid. For example, the pressurized fluid source 330 may be a tank and/or a pump. The pressurized fluid source 330 may be disposed on the vehicle that may receive the axle assembly 10 and may provide a pressurized fluid for actuating the piston 274.

Operation of the brake assembly 36 will now be described. More specifically, operation of the brake assembly 36 will be described starting with the piston 274 in the retracted position. In the retracted position, the piston 274 may be disposed proximate the disc pack 270 such that the stationary discs 282 and friction discs 280 may not be deflected or urged against the flange 54 of the axle housing 40. As such, force may not be exerted by the piston 274 against the disc pack 270 to brake to inhibit rotation of a wheel 14. In response to a brake command, a controller may open one or more valves to permit pressurized fluid to flow from the pressurized fluid source 330 through the fluid passage 84 to actuate the piston 274. The pressurized fluid may exert force on the piston 274 that may overcome the biasing force of the biasing members 278 and actuate the piston 274 from the retracted position toward an extended position. In the extended position, the piston 274 may move toward the disc pack 270 and may urge the disc pack 270 toward the flange 54 such that the stationary discs 282 and friction discs 280 may be deflected or urged toward the flange 54 and against each other. For example, force exerted by the piston 274 may cause the set of ribs 304 to engage the disc pack 270 and may actuate or deflect the disc pack 270 against the first flange surface 60. As such, the stationary discs 282 and the friction discs 280 may be pushed or urged toward the flange 54 by the piston 274 and may engage each other, resulting in friction that may inhibit rotation of the friction discs 280 about the axis 58 with respect to the stationary discs 282. The friction discs 280 may then inhibit rotation of the sun gear 120, axle shaft 22, planetary gear set 24, and the output flange 26 and its associated wheel 14. Venting pressurized fluid from the fluid passage 84 may allow the piston 274 to move from the extended position toward the retracted position under the biasing force of the biasing members 278.

Providing a brake assembly that is actuated against a flange 54 of the axle housing 40 may help reduce components and manufacturing complexity of an axle assembly 10. For example, the flange 54 may replace a reaction plate or other component that may be separate from the housing assembly 20. In addition, providing an integral flange 54 with the axle housing 40 may be stronger and stiffer than a separate reaction plate, which may result in more uniform pressure distribution and temperature distribution within the disc pack 270, which in turn may improve braking performance and reduce wear of the brake assembly 36. An integral flange 54 may also reduce weight and may reduce the axial length of the axle assembly 10 as compared to an axle assembly having a separate reaction plate.

Referring to FIGS. 2, 4, and 7-10, the sun gear positioning arrangement 38 will now be described in more detail. The sun gear positioning arrangement 38 may help constrain axial movement of the sun gear 120, or movement of the sun gear 120 along the axis 58. The first axle shaft snap ring 114 and the second axle shaft snap ring 116 may limit movement of the sun gear 120 along the axle shaft 22.

In at least one embodiment, the sun gear positioning arrangement 38 may include a washer 350, one or more snap rings 352, a thrust washer 354, and a brake housing snap ring 356.

Referring to FIGS. 4 and 9, washer 350 may extend around the axis 58 and the sun gear 120. More specifically, the washer 350 may be received in the washer groove portion 144 of the sun gear 120. As is best shown in FIG. 10, the washer 350 may be received in the inner ring hole 92 the brake housing 42. The washer 350 may be a thrust washer that may bear axial thrust loads. As is best shown with reference to FIGS. 4 and 7, the washer 350 may have a first side 360, a second side 362, an outer side 364, and a hole 366.

The first side 360 may face toward the planet carrier 126. In at least one embodiment, the first side 360 may be substantially planar and may be disposed substantially perpendicular to the axis 58. As is best shown in FIG. 7, at least a portion of the first side 360 may be received in the washer groove portion 144 and may be disposed proximate and may engage the washer groove side surface 152 that is disposed closest to the planet carrier 126.

The second side 362 may be disposed opposite the first side 360. As such, the second side 362 may face toward the ring step surface 102 of the brake housing 42. In at least one embodiment, the second side 362 may be substantially planar and may be disposed substantially perpendicular to the axis 58. At least a portion of the second side 362 may be received in the washer groove portion 144 and may be disposed proximate and may engage the washer groove side surface 152 that is disposed closest to the ring step surface 102.

The outer side 364 may extend from the first side 360 to the second side 362. The outer side 364 may be an outside circumferential surface of the washer 350. The outer side 364 may extend around the axis 58 and may be spaced apart from inner surface 100 of the brake housing 42.

The hole 366 may be disposed opposite the outer side 364. The hole 366 may extend around the axis 58 and may extend from the first side 360 to the second side 362. The hole 366 may receive the sun gear 120 and may receive or may be at least partially defined by a set of washer teeth 368. The washer teeth 368 may be arranged around the axis 58 and may extend toward the axis 58. The washer teeth 368 may have a similar arrangement as the first set of teeth 136 of the sun gear 120 to allow the sun gear 120 to be inserted into the hole 366 when the washer teeth 368 are aligned with gaps between the first set of teeth 136 of the sun gear 120. Some or all of the washer teeth 368 may be disposed proximate and may engage the washer groove bottom surface 150. In addition, the washer teeth 368 may inhibit rotation of the washer 350 with respect to the sun gear 120 in one or more embodiments.

One or more snap rings 352 may be disposed adjacent to the washer 350. A snap ring 352 may inhibit axial movement of the washer 350 with respect to the sun gear 120. A snap ring 352 may extend at least partially around the axis 58 and the sun gear 120. More specifically, a snap ring 352 may be received in the snap ring groove portion 146 of the sun gear 120. In the embodiment shown, two snap rings 352 are provided that are disposed in corresponding snap ring grooves 146 and are disposed on opposite sides of the washer 350. For convenience in reference, the snap ring 352 that is disposed closest to the first axle shaft snap ring 114 may be referred to as a first snap ring 352 while the snap ring 352 that is disposed furthest from the first axle shaft snap ring 114 may be referred to as a second snap ring 352.

The first snap ring 352 may be disposed proximate and may engage the first side 360 of the washer 350. The second snap ring 352 may be disposed proximate and may engage the second side 362 of the washer 350. As such, the first snap ring 352 and the second snap ring 352 may cooperate to inhibit axial movement of the washer 350. It is also contemplated that a snap ring 352 may be omitted and that the sun gear 120 may be configured with an integral ring or stop that may inhibit axial movement of the washer 350 in one direction. In at least one embodiment, the snap ring 352 may include a first snap ring side 370, a second snap ring side 372, and an inner side 374.

The first snap ring side 370 may be disposed opposite the washer 350. In at least one embodiment, the first snap ring side 370 may be substantially planar and may be disposed substantially perpendicular to the axis 58. As is best shown in FIG. 7, at least a portion of the first snap ring side 370 may be received in the snap ring groove portion 146 and may be disposed proximate and may engage the snap ring groove side surface 162.

The second snap ring side 372 may be disposed opposite the first snap ring side 370. As such, the second snap ring side 372 may face toward and may engage the washer 350. In at least one embodiment, the second snap ring side 372 may be substantially planar and may be disposed substantially perpendicular to the axis 58. At least a portion of the second snap ring side 372 may be received in the snap ring groove portion 146.

The inner side 374 may extend from the first snap ring side 370 to the second snap ring side 372. The inner side 374 may be an inner surface or inner circumference of the snap ring 352. The inner side 374 may be disposed proximate and may engage the snap ring groove bottom surface 160. In addition, the inner side 374 may define a hole that may receive the sun gear 120.

Referring to FIGS. 7 and 10, one or more thrust washers 354 may be received in the inner ring hole 92 the brake housing 42. A thrust washer 354 may extend around and may be spaced apart from the axis 58. In addition, a thrust washer 354 may be spaced apart from and may not engage the sun gear 120 and the snap ring 352. In the embodiment shown, two thrust washers 354 are provided that may be disposed adjacent to the washer 350 and may be disposed on opposite sides of the washer 350. For convenience in reference, the thrust washer that is disposed closest to the brake housing snap ring 356 may be referred to as a first thrust washer 354 while the thrust washer that is disposed furthest from the brake housing snap ring 356 may be referred to as a second thrust washer 354.

As is best shown in FIG. 7, the first thrust washer 354 may be disposed between the washer 350 and the brake housing snap ring 356. The first thrust washer 354 be disposed proximate and may engage the first side 360 of the washer 350. In addition, the first thrust washer 354 may be disposed proximate and may engage the brake housing snap ring 356. The first thrust washer 354 may extend around and may be spaced apart from the first snap ring 352.

The second thrust washer 354 may be disposed proximate and may engage the second side 362 of the washer 350. In addition, the second thrust washer 354 may engage a portion of the brake housing 42, such as the ring step surface 102. The second thrust washer 354 may extend around and may be spaced apart from the second snap ring 352. As such, the first thrust washer 354 and the second thrust washer 354 may cooperate to inhibit axial movement of the washer 350. It is also contemplated that a thrust washer 354 may be omitted. For example, the second thrust washer 354 may be omitted and the washer 350 may directly engage the ring step surface 102.

Referring to FIGS. 4 and 7, the thrust washer 354 may include a first thrust washer side 380, a second thrust washer side 382, an outer thrust washer side 384, and one or more tabs 386.

The first thrust washer side 380 may be disposed opposite the washer 350. In at least one embodiment, the first thrust washer side 380 may be substantially planar and may be disposed substantially perpendicular to the axis 58. As is best shown in FIG. 7, at least a portion of the first thrust washer side 380 may be disposed proximate and may engage the brake housing snap ring 356. The first thrust washer side 380 may be substantially coplanar with the first snap ring side 370 in one or more embodiments.

The second thrust washer side 382 may be disposed opposite the first thrust washer side 380. As such, the second thrust washer side 382 may face toward and may engage the washer 350. In at least one embodiment, the second thrust washer side 382 may be substantially planar and may be disposed substantially perpendicular to the axis 58. The second thrust washer side 382 may be substantially coplanar with the second snap ring side 372 in one or more embodiments.

The outer thrust washer side 384 may extend from the first thrust washer side 380 to the second thrust washer side 382. The outer thrust washer side 384 may be an outer surface or outer circumferential surface of the thrust washer 354. The outer thrust washer side 384 may be disposed proximate and may engage the inner surface 100 of the brake housing 42.

Referring to FIGS. 4 and 10, or more tabs 386 may extend from the thrust washer 354. In the embodiment shown, two tabs 386 are provided; however, it is contemplated that a greater or lesser number of tabs may be provided. The tabs 386 may extend away from the axis 58 and may extend away from the outer thrust washer side 384 or outside circumference of the thrust washer 354. A tab 386 may be received in a corresponding tab slot 98 of the inner ring 82 of the brake housing 42. As such, the tab 386 may engage the inner ring 82 of the brake housing 42 to inhibit rotation of the thrust washer 354 about the axis 58 and with respect to the housing assembly 20.

The brake housing snap ring 356 may extend at least partially around the axis 58 and may be received in the brake housing snap ring groove 104. The brake housing snap ring 356 may inhibit axial movement of the thrust washers 354 and the washer 350 with respect to the inner ring 82 of the brake housing 42. More specifically, the brake housing snap ring 356 may engage the first thrust washer 354 which in turn may engage the washer 350. The washer 350 may engage the second thrust washer 354 which in turn may engage the brake housing 42. As such, the thrust washers 354, brake housing snap ring 356, and the brake housing 42 may cooperate to inhibit axial movement of the washer 350, and consequently the sun gear 120, with respect to the housing assembly 20.

Referring to FIG. 8, another embodiment of a sun gear positioning arrangement 38' is shown. In FIG. 8, the washer groove and snap ring groove may be provided as a single groove in the sun gear 120. As such, the washer groove bottom surface and snap ring groove bottom surface may be combined into a common bottom surface. In such a configuration, has a set of washer teeth that are arranged around the axis, wherein each member of the set of washer teeth is disposed between two members of the set of teeth of the sun gear It is also contemplated that the sun gear positioning arrangement may be provided in other configurations. As one example, the washer groove portion 144 may be omitted and the snap ring grooves 146 may be spaced apart from each other without an intervening groove. As another example, the washer groove portion 144 and snap ring grooves 146 may be provided, but may be configured such that at least one snap ring groove bottom surface 160 may be disposed closer to the axis 58 than the washer groove bottom surface 150.

The sun gear positioning arrangement 38 may axially constrain movement of the sun gear 120 in a compact, cost-effective manner. For example, the sun gear positioning arrangement 38 may constrain movement of the sun gear 120 without providing additional components, such as shims or spacers that may be positioned between the sun gear and other axially stationary members, such as a planet carrier, output flange, axle housing, or brake housing. Such spacers may increase cost and manufacturing complexity and may require shims or spacers that are individually tailored to accommodate the dimensional tolerances of a particular axle assembly. The sun gear positioning arrangement 38 may also permit good lubricant flow around its external thrust surfaces, which may help avoid overheating or scoring of components of the sun gear positioning arrangement 38.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing;
   a brake housing that is fixedly disposed on the axle housing, wherein the brake housing receives a brake assembly and has an outer ring that extends around an axis and has holes that receive fasteners that couple the brake assembly to the brake housing and a positioning ring that extends around the axis;
   a wheel bearing cage that is fixedly disposed on the brake housing such that the brake housing extends from the axle housing to the wheel bearing cage, wherein the positioning ring is received in the wheel bearing cage;
   a planetary gear set that is received in the wheel bearing cage, the planetary gear set having a planet carrier that rotates about the axis;
   an output flange that is configured to facilitate mounting of a wheel, wherein the output flange is disposed on the planet carrier;
   a roller bearing assembly that is disposed on the wheel bearing cage and rotatably supports the output flange; and
   a preload bolt that couples the output flange to the planet carrier, wherein a preload force is exerted on the roller bearing assembly when the preload bolt is tightened to the planet carrier.

2. The axle assembly of claim 1 wherein the preload bolt has a preload bolt flange that has a set of preload bolt flange openings, wherein a locking fastener is received in a member of the set of preload bolt flange openings and is coupled to the output flange to inhibit relative rotation of the preload bolt about the axis with respect to the output flange.

3. The axle assembly of claim 1 wherein the preload bolt extends along the axis and engages the output flange.

4. The axle assembly of claim 3 wherein the planet carrier has a threaded hole that extends along the axis and that receives a threaded portion of the preload bolt.

5. The axle assembly of claim 4 wherein the output flange has an output flange hole that receives the planet carrier and the preload bolt.

6. The axle assembly of claim 5 wherein the planet carrier has a shaft portion that extends along the axis and into the output flange hole, wherein the threaded hole is disposed in the shaft portion.

7. The axle assembly of claim 1 wherein the output flange is spaced apart from and does not engage the wheel bearing cage.

8. The axle assembly of claim 1 wherein the planet carrier engages the output flange and is spaced apart from and does not engage the wheel bearing cage.

9. The axle assembly of claim 2 wherein the preload bolt flange openings are generally semicircular and extend from an outside circumferential surface of the preload bolt flange toward the axis.

10. An axle assembly comprising:

an axle housing;

a brake housing fixedly disposed on the axle housing;

a wheel bearing cage fixedly disposed on the brake housing;

an axle shaft that is disposed in the axle housing and rotates about an axis;

a planetary gear set that is disposed on the axle shaft and is received in the wheel bearing cage, the planetary gear set having a planet carrier;

an output flange that is disposed on the planet carrier, wherein the output flange has a step surface that extends between a second inner surface and a third inner surface that extend around the axis and partially define an output flange hole, wherein the third inner surface has a larger diameter than the second inner surface;

a preload bolt that extends along the axis and couples the output flange to the planet carrier, wherein the preload bolt is received in the output flange hole and has a preload bolt flange that exerts force on the step surface and that has a preload bolt flange opening, wherein the third inner surface extends around the preload bolt and the preload bolt is spaced apart from the third inner surface; and a locking fastener that is received in the preload bolt flange opening and extends through the step surface to inhibit rotation of the preload bolt about the axis.

11. The axle assembly of claim 10 wherein the output flange has a first inner surface that extends around the axis and at least partially defines the output flange hole, wherein the preload bolt is spaced apart from the first inner surface.

12. The axle assembly of claim 11 wherein a preload bolt seal is disposed between the second inner surface and the preload bolt.

13. The axle assembly of claim 12 wherein the second inner surface is axially positioned between the first inner surface and the third inner surface.

14. The axle assembly of claim 10 wherein the preload bolt flange engages the step surface and is spaced apart from the third inner surface.

15. An axle assembly comprising:

an axle housing;

a wheel bearing cage fixedly positioned with respect to the axle housing;

a planetary gear set that is received in the wheel bearing cage, the planetary gear set having a planet carrier that rotates about an axis;

an output flange that is partially received in the wheel bearing cage, wherein the output flange is disposed on the planet carrier;

a first roller bearing assembly and a second roller bearing assembly that are disposed on the wheel bearing cage and that rotatably support the output flange; and a preload bolt that couples the output flange to the planet carrier, wherein the preload bolt exerts a preload force that biases the first roller bearing assembly toward the second roller bearing assembly and the preload bolt includes a threaded preload bolt body and a preload bolt flange that extends from the preload bolt body and wherein a preload bolt seal is spaced apart from the preload bolt body and extends from the preload bolt flange to the output flange.

16. The axle assembly of claim 15 wherein the first roller bearing assembly has a first inner race that engages the output flange, wherein the first inner race is biased toward the planet carrier when the preload bolt is tightened.

17. The axle assembly of claim 15 wherein the second roller bearing assembly has a second inner race that engages the output flange and the planet carrier, wherein the second inner race is biased toward the first roller bearing assembly when the preload bolt is tightened.

18. The axle assembly of claim 15 wherein the output flange has an output flange hole and the planet carrier and the preload bolt engage the output flange in the output flange hole.

19. The axle assembly of claim 15 wherein the preload bolt extends along the axis and a locking fastener is offset from the axis and engages the preload bolt and the output flange to inhibit relative rotation of the preload bolt with respect to the output flange.

* * * * *